United States Patent [19]
Jimenez

[11] Patent Number: 5,735,058
[45] Date of Patent: Apr. 7, 1998

[54] MEASURING RULE

[76] Inventor: Ruben Jimenez, 1038 Woolworth St., Houston, Tex. 77020

[21] Appl. No.: 612,249

[22] Filed: Mar. 7, 1996

[51] Int. Cl.$^6$ .................................................. G01B 3/08
[52] U.S. Cl. ........................... 33/809; 33/483; 33/494; 33/542.1
[58] Field of Search ........................... 33/809, 464, 483, 33/484, 485, 494, 806, 810, 811, 812, 827, 830, 542, 542.1

[56] References Cited

U.S. PATENT DOCUMENTS

| | | |
|---|---|---|
| 224,401 | 2/1880 | Derickson .................................. 33/809 |
| 1,488,482 | 4/1924 | Eckman .................................... 33/809 |
| 2,642,667 | 6/1953 | Smiley ...................................... 33/809 |
| 4,160,328 | 7/1979 | Ernst . |
| 4,170,826 | 10/1979 | Holstein . |
| 4,336,655 | 6/1982 | Thingstad . |
| 4,534,113 | 8/1985 | Holstein . |
| 4,566,200 | 1/1986 | Brady et al. . |
| 5,343,628 | 9/1994 | Ham .......................................... 33/809 |

*Primary Examiner*—Christopher W. Fulton
*Attorney, Agent, or Firm*—Gunn & Associates, P.C.

[57] ABSTRACT

An extendible measuring rule comprises a main frame and an extension element. The extension element is mounted within the main frame for easy extension and manipulation of the extension element. The main frame includes one or more scale markings, one of which is included beneath the extension element, and is progressively exposed as the extension element is withdrawn from the main frame.

8 Claims, 1 Drawing Sheet

MEASURING RULE

FIELD OF THE INVENTION

The present invention relates generally to the field of measuring rules, and more particularly to a measuring rod that provides a total length of a distance of an inside or an outside length to be measured.

BACKGROUND OF THE INVENTION

Known measurement scales provide a set of telescopic components with internal friction to slide in relation from a main scale body to an extension slide. These scales provide an indication of the length of the main body and a separate indication of the length of the extension slide. However, in an extended position, these measuring devices require the user to calculate the total length measured, including the length of a body and the length the telescopic component or slide.

Other measuring rules or rods comprise several graduated components of different lengths relative to each other, each of which is arranged to telescope in relation to the others, and all the components are so arranged to extend from the outermost component in a single direction. This provides for measuring the inside diameter of components to be measured but is inadequate to measure the inside diameter, if required.

A commonly used measuring rule comprises a thin metal measuring tape which extends from a reel. This rule has proved satisfactory for many applications but suffers from the limitation in that for extended measurements, the rule easily bends. The rule retracts into the reel by spring action and shows the total length of measurement, but for measurements of over a few feet, the rule becomes unwieldy and difficult to manage. This often requires the assistance of a helper to hold the rule in place while a measurement is taken.

Thus, there remains a need for a measuring rule that provides the total length of measurement to the user and remains rigid while in use. Such a measuring rule should be equally applicable to measurements of inside and outside diameter of an object under measurement. It should also be inexpensive and yet durable.

SUMMARY OF THE INVENTION

The present invention solves these and other drawbacks of the prior art by providing a substantially rigid measuring tool that indicates to the user the total length to be measured. The device comprises primarily a rigid main body with a slide member that slidingly engages with the main body. Beneath the slide member and marked upon the main body is a "total length" scale, indicating the sum of the length of the main body and the slide member extended from the main body.

The extension of the slide member from the main body is primarily designed to measure an inside diameter. However, a preferred embodiment of the present invention also includes an extendible hinge stop to provide the same advantage in measuring an outside diameter. A set of rotatable arms extends from the main body to grasp the outside limit of a structure to be measured, thus providing a precise datum from which to measure the structure, as well as indicating the total length to be measured.

These and other features of the present invention will be apparent to those of skill in the art from a review of the following detailed description along with the accompanying drawings.

DETAILED DESCRIPTION OF A PREFERRED EMBODIMENT

Figure 1:
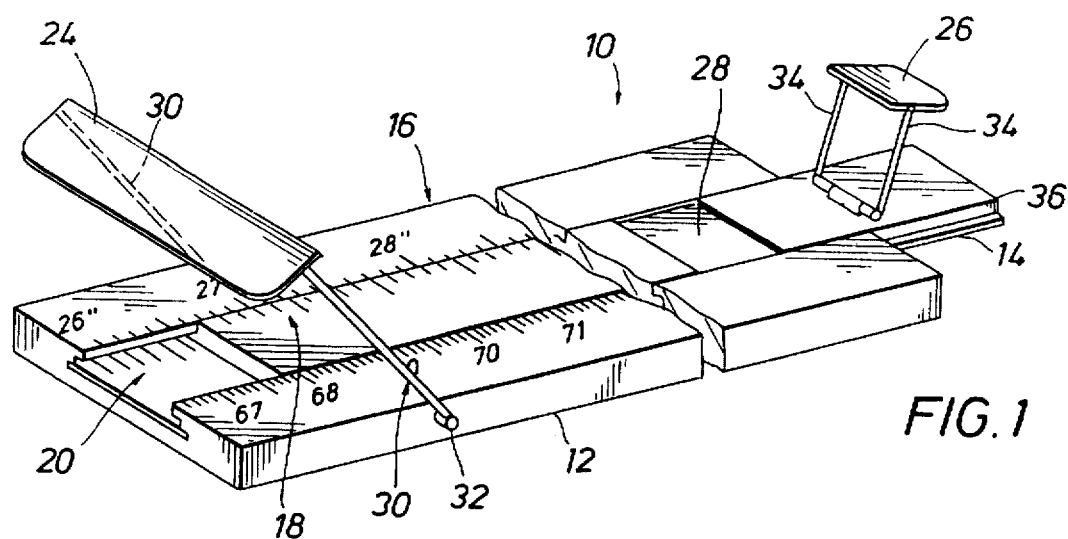
FIG. 1 is a perspective view of the measuring rule of the present invention.

Referring now to the drawing Figures of the preferred embodiment, FIG. 1 depicts a semi-rigid measuring rule 10 with an extension to show the total length for measurement. In the following description, common components of the present invention are commonly numbered.

The measuring rule 10 comprises primarily a main body 12 and an sliding extension 14. The main body 12 may include a measuring scale 16 and a similar scale 18 on the sliding extension 14. The scale 18 on the sliding extension may be eliminated to avoid confusion by the user. A significant feature of the present invention includes a scale 20 that indicates to the user the total length of the main body 12 and the extent of the extension 14 protruding from the main body.

Figure 2:
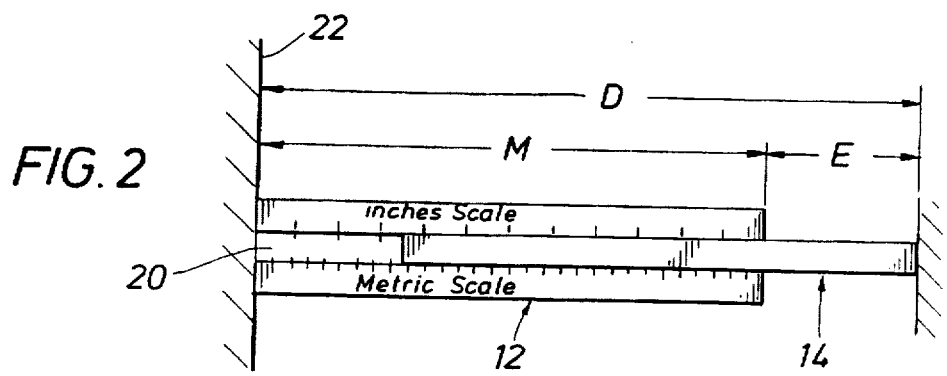
FIG. 2 is a top view of the measuring rule against a datum for measurement.

Referring now to FIG. 2, the main body 12 and the extension 14 provide the total length under measurement. The length of the main body is indicated in FIG. 2 as M and the length of the extension protruding from the main body is indicated as E. Together, these indicate the total distance, D. As shown in FIG. 2, these distances may be indicated in the English or metric scale.

In use the main body 12 is placed abuttingly against a backing 22 or otherwise secured along one limit of the length to be measured. The extension 14 is then withdrawn from the main body to the other limit to be measured. The scale 20 indicates to the user the total, D, without further mental gymnastics on the part of the user.

Referring again to FIG. 1, if the user has need to measure the outside diameter of an object, an extendible set of arms 24 and 26 provide a means of securing the measuring rule 10 to the object for measurement. The arms 24 and 26 preferably rotate out of the way for ID measurement, but are easily accessible for OD measurement, if desired. Note, however, that the securing arm 24 is mounted to the main body 12 and the arm 26 is mounted to the extension slide 14. If desired, the arm 24 may retract into a recess and the arm 26 may retract into its own recess 28. The arm 24 is mounted to the main body by pins 30 about an axis or pivot 32. The arm 26 is similarly mounted by pins 34 about an axis or pivot 36. The lengths of the pins 30 and 34 are selected so that they snap into place when extended for OD measurement. When in place, the arms 24 and 26 meet flush with the ends of the main body and the extension, respectively, for precise measurement.

Figure 4:
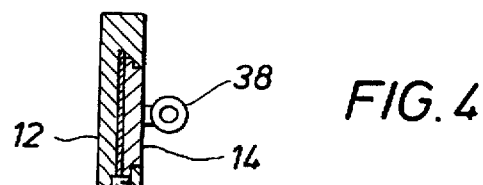
FIG. 4 is a cross-section of the measuring rule.
Figure 3:
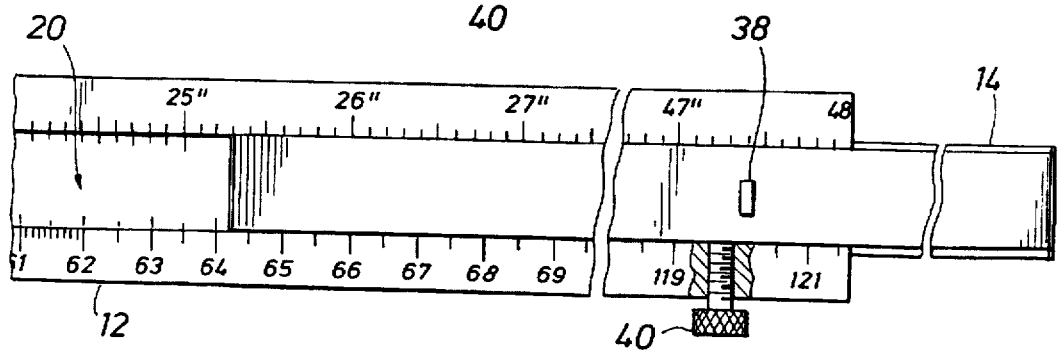
FIG. 3 shows additional details of the underlying scale of the present invention.

Referring now to FIGS. 3 and 4, the present invention further includes a slide handle 38 and a lock screw 40. The slide handle 38 provides ease of handling to the user and may be of any appropriate silhouette. The lock screw 40 may also be of any appropriate silhouette, such that it is easily manipulated by the user, and does not interfere with measurements.

Finally, as show in FIG. 4, the slide 14 is preferably a T-shaped cross-sectional member, sliding easily within the main body 12. Other configurations are of course available but this structure has been found to the easily manufactured and assembled, and sturdy in use.

Note that the measuring rule of the present invention may be made in a variety of standard lengths, such as 24", 48", and 60" for measurements up to a maximum of 10 feet or more, if desired. This rule may also be sold as a set of several such lengths. Since the measuring rule of the present invention is substantially rigid, in contract to standard measuring tape, one may measure the inside or outside diameter of an object and may do so without assistance, which is often required with flexible measuring tape. Further, use of the present invention may also eliminate the need for climbing a step ladder, which is often required in making certain measurements.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A measuring rule comprising:
   a. a substantially rigid main body;
   b. an extension, slidingly engaged on the main body;
   c. a total length scale on the main body, indicating the sum of the length of the main body and the length of the extension protruding beyond an end of the main body: and
   d. a main body length scale indicating the length of a measurement along the main body.

2. The measuring rule of claim 1 wherein the extension defines a T-shaped cross-section.

3. The measuring rule of claim 1 further comprising a rotatable arm mounted about an axis extending from the main body for measuring an outside diameter of an object under measurement.

4. The measuring rule of claim 1 further comprising a rotatable arm mounted about an axis extending from the extension for measuring an outside diameter of an object under measurement.

5. The measuring rule of claim 1 further comprising:
   a. a first rotatable arm mounted about an axis extending from the main body; and
   b. a second rotatable arm mounted about an axis extending from the extension, the first and second rotatable arms providing means for measuring an outside diameter of an object.

6. The measuring rule of claim 1 further comprising a slide handle on the extension.

7. The measuring rule of claim 1 further comprising a lock screw through the main body for abuttingly engaging the extension.

8. The measuring rule of claim 1 wherein the total length scale on the main body is hidden beneath the extension until the extension slides in relation to the main body.

* * * * *